(12) United States Patent
Akai et al.

(10) Patent No.: US 7,795,798 B2
(45) Date of Patent: Sep. 14, 2010

(54) TRANSPARENT FLUORESCENT GLASS

(75) Inventors: Tomoko Akai, Ikeda (JP); Kohei Kadono, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 136 days.

(21) Appl. No.: 11/990,224

(22) PCT Filed: Aug. 8, 2005

(86) PCT No.: PCT/JP2005/014521
§ 371 (c)(1),
(2), (4) Date: Feb. 8, 2008

(87) PCT Pub. No.: WO2007/017928
PCT Pub. Date: Feb. 15, 2007

(65) Prior Publication Data
US 2009/0231830 A1 Sep. 17, 2009

(51) Int. Cl.
*C03C 3/087* (2006.01)
(52) U.S. Cl. .................. 313/503; 501/70; 252/301.4 F
(58) Field of Classification Search ......... 313/501–503; 362/84; 501/64, 70; 252/301.4 F, 301.4 R
See application file for complete search history.

(56) References Cited

U.S. PATENT DOCUMENTS 2,857,541 A * 10/1958 Etzel et al. ................. 313/502
3,300,670 A * 1/1967 Veras ......................... 313/461
5,755,998 A * 5/1998 Yamazaki et al. ...... 252/301.4 P
7,667,791 B2 * 2/2010 Shiratori et al. ............... 349/70
2006/0037366 A1 * 2/2006 Chen et al. ..................... 65/399

FOREIGN PATENT DOCUMENTS

| JP | 08-133780 A | 5/1996 |
| JP | 09-202642 A | 8/1997 |
| JP | 10-167755 A | 6/1998 |
| JP | 10-236843 A | 9/1998 |
| JP | 2001-214162 A | 8/2001 |
| JP | 2001-278636 A | 10/2001 |
| JP | 2004-331442 A | 11/2004 |
| JP | 2008115223 A * | 5/2008 |
| WO | PCT/JP03/15208 | * 5/2005 |

* cited by examiner

*Primary Examiner*—Peter Macchiarolo
(74) *Attorney, Agent, or Firm*—Fitch Even Tabin & Flannery; Kendrew H. Colton

(57) ABSTRACT

A transparent white fluorescent glass is provided which contains a soda lime glass as a base material, 0.8 to 2.5 wt % of Sn, calculated as SnO, and 0.045 wt % or less of Fe, calculated as $Fe_2O_3$, and a transparent white fluorescent glass which contains the soda lime glass as a base material, 0.8 to 2.5 wt % of Sn, calculated as SnO, and 0.02 to 0.14 wt % of Ce, calculated as $CeO_2$. This fluorescent glass can be suitably used for producing at low cost a large plate material having a size that is several tens of centimeters or more that is easy and simple to operate and exhibits satisfactory white fluorescence by ultraviolet ray irradiation.

14 Claims, 2 Drawing Sheets

TRANSPARENT FLUORESCENT GLASS

CROSS-REFERENCE TO RELATED APPLICATION

This is a U.S. National Phase of International Application PCT/JP2005/014521, filed Aug. 8, 2005, the entire disclosure of which is hereby incorporated herein by reference.

TECHNICAL FIELD

The present invention relates to a white fluorescent glass having excellent transparency, a lighting system comprising the glass, and a display device comprising the glass.

BACKGROUND ART

In recent years, glasses exhibiting fluorescence in the visible spectrum range generated by ultraviolet excitation have become the object of attention, and lights, displays, designed glassware, etc. prepared using such glasses are being used in practice.

The following glasses are known as glasses having a fluorescent property when excited by ultraviolet rays; (1) a fluorophosphate fluorescent glass that contains terbium (Tb) or europium (Eu) as a fluorescent agent, and may further contain another rare earth element (Patent Document 1); (2) a visible fluorescent fluorophosphate glass exhibiting blue or white fluorescence comprising phosphorus (P), oxygen (O), and fluorine (F) as a glass constituent, and at least one member selected from divalent europium (Eu), terbium (Tb), and (samarium+manganese) as a fluorescent agent (Patent Document 2); (3) an oxide fluorescent glass containing silicon (Si), boron (B), and oxygen (O) as a glass constituent, and terbium (Tb) or europium (Eu) as a fluorescent agent (Patent Document 3); (4) a blue fluorescent glass containing $Cu^+$ ions as a fluorescent agent (Patent Document 4); (5) a fluorescent glass containing oxy nitride (Patent Document 5); etc.

However, glass containing a rare earth is expensive, and therefore, it is impractical to form the glass into a large plate having a size in the order of several tens of centimeters.

To produce a Cu-containing blue fluorescent glass, glass-forming materials are melted in a reducing atmosphere to prevent the formation of $Cu^{2+}$ ions, thus giving stabilized $Cu^+$ ions. However, in the glass production process, too much reduction causes deposition of a metallic colloid and it is difficult to obtain a glass having the desired properties.

Since an oxy-nitride-containing glass has a high melting point, it requires high temperatures of around 1700° C. and specialized equipment to produce a glass. Further, the glass has the drawback of low mechanical-processing properties.

When a glass material is utilized in products other than designed glassware, for example, in displays, lamps, built-in illumination equipment, etc., it would be desirable that the glass itself exhibits a white light emitted by ultraviolet excitation rather than exhibiting one specific color of light such as blue. However, all of the glasses mentioned above utilize a luminescence caused by transition between specific energy levels of rare earths or transition metals, and thus, only glasses that exhibit one specific color of light are obtained. Patent Document 2 discloses the composition of a glass exhibiting a white light; however, said glass requires a large amount of expensive rare earth metals as described above and further needs to be melted in a reducing atmosphere to maintain a valence balance. Therefore, the glass obtained will be extremely expensive and thus is not suitable for mass production.

Therefore, a demand exists for the development of a novel glass that contains inexpensive metal ions as a dopant and can be produced by being melted using a general method, as well as provides a white light having sufficient intensity.

Patent Document 1: Japanese Unexamined Patent Application Publication No. 1996-133780

Patent Document 2: Japanese Unexamined Patent Application Publication No. 1998-167755

Patent Document 3: Japanese Unexamined Patent Application Publication No. 1997-202642

Patent Document 4: Japanese Unexamined Patent Application Publication No. 1998-236843

Patent Document 5: Japanese Unexamined Patent Application Publication No. 2001-214162

DISCLOSURE OF THE INVENTION

Problems to be Solved by the Invention

The present invention was accomplished in view of the state of the prior art mentioned above. The main object of the present invention is to provide a novel fluorescent glass capable of producing a large plate material having a size of several tens of centimeters or larger at low cost with a simple production method, as well as exhibiting a sufficient intensity of white light.

Means for Solving the Problem

The present inventors conducted extensive research to achieve the above object and found that a relatively strong white light generated by ultraviolet excitation can be obtained when Sn was added at a specific content to a soda lime glass, which is used as a basic material. Further, the inventors found that the fluorescence intensity of the glass can be raised by controlling the content of Fe, which originates from raw silica sand and which is naturally included in a soda lime glass, or by adding a specified amount of a specific photo-sensitizer to the soda lime glass. The present invention was accomplished based on these findings.

That is, the present invention provides the following transparent white fluorescent glass, a lighting system comprising the glass, and a display device comprising the glass.

1. A transparent white fluorescent glass comprising a soda lime glass as a base material, 0.8 to 2.5 wt % of Sn, calculated as SnO, and 0.045 wt % or less of Fe, calculated as $Fe_2O_3$.

2. A transparent white fluorescent glass according to Item 1, wherein the content of Fe is 0.02 to 0.04 wt %, calculated as $Fe_2O_3$.

3. A transparent white fluorescent glass comprising soda lime glass as a base material, 0.8 to 2.5 wt % of Sn, calculated as SnO, and 0.02 to 0.14 wt % of Ce, calculated as $CeO_2$.

4. A lighting system comprising as a constituent the transparent white fluorescent glass according to Item 1.

5. A lighting system comprising as a constituent the transparent white fluorescent glass according to Item 3.

6. A display device comprising as a constituent the transparent fluorescent glass according to Item 1.

7. A display device comprising as a constituent the transparent fluorescent glass according to Item 3.

In the transparent fluorescent glass of the present invention, the specific additive component is added to the soda lime glass as a base glass.

In this description, the term "transparent" regarding the glass means that the transmittance of the glass with a thickness of 1 mm is 80% or more in the visible spectrum range of 400 nm to 800 nm, and no specific absorption is observed in this wavelength range.

The composition of the soda lime glass is not particularly limited. A known soda lime glass can be used, which contains $SiO_2$, $Na_2O$, CaO, etc. as main components, and which may further contain $Al_2O_3$, MgO, etc.

For example, a glass can be used that contains, based on the total amount of transparent white fluorescent glass of the present invention, about 65 to about 75 wt % of $SiO_2$, about 10 to about 20 wt % of $Na_2O$, and about 5 to about 15 wt % of CaO. By using such a soda lime glass as a base glass, a large fluorescent glass plate having a size of several tens of centimeters or more can be obtained at low cost.

The transparent white fluorescent glass of the present invention contains Sn as an additive component. When the soda lime glass includes Sn therein, the glass exhibits a relatively strong white light generated by ultraviolet excitation. The content of Sn needs to be about 0.8 to about 2.5 wt %, preferably about 1 to about 2 wt % calculated as SnO, based on the total amount of the transparent white fluorescent glass of the invention. In this description, the amount of Sn is calculated as "SnO", i.e., as $Sn^{2+}$, but both $Sn^{2+}$ and $Sn^{4+}$ can be present in the glass obtained after melting.

In the transparent white fluorescent glass of the invention, too much tin oxide may cause deposition of Sn or the like as a metal during melting the raw material when producing the transparent fluorescent glass, or exhibit a strong blue light in the visible spectrum range due to the reduction of $Fe^{3+}$ to $Fe^{+2}$. Thus, too much tin oxide is not preferable. In contrast, an extremely low amount of tin oxide causes deterioration in the luminescence intensity since the effect by adding tin oxide cannot be fully achieved.

When the transparent white fluorescent glass of the present invention contains about 0.8 to about 2.5 wt % of Sn calculated as SnO, and about 0.045 wt % or less of Fe calculated as $Fe_2O_3$, based on the total amount of glass, a fluorescent glass having high fluorescence intensity can be attained. The Fe component in the glass preferentially traps electrons or holes and such an impurity acts as a strong quenching center. Thus, glass with an excessive content of Fe component cannot exhibit strong fluorescence. Therefore, the smallest amount of Fe is preferable in order to increase the luminescence intensity of the white light emitted due to the recombination of electrons and holes that may be generated around non-bridging oxygen atoms by ultraviolet excitation. However, an extremely low amount of Fe may result in a glass having high transmittance of the Hg UV ray (254 nm). Further, since most of the glass-forming materials contain Fe components, if the final Fe contents are greatly reduced, the glass production cost will be greatly increased. Thus, it lacks practicality. In this respect, the content of Fe is preferably from about 0.02 wt % to about 0.04 wt % calculated as $Fe_2O_3$.

When the transparent white fluorescent glass of the present invention contains about 0.8 to about 2.5 wt % of Sn, calculated as SnO, and Ce that preferentially absorbs ultraviolet rays to cause a photochemical reaction and then induce photosensitized reaction, high fluorescence intensity can be exhibited.

Under ultraviolet ray irradiation, $Ce^{4+}$ reacts as follows; $Ce^{4+} \rightarrow Ce^{3+}+e$. Then, an electron is provided to another element to increase the luminescence of another element. Further, the addition of $CeO_2$ to the glass exhibits a remarkable effect, which is a secondary effect optically, that the glass absorbs the ultraviolet rays having a wavelength of 315 nm or less that are said to be harmful to the human body and converts the rays into luminescence having a wavelength in the vicinity of 380 nm. As a result, in a lighting system comprising the glass of the present invention, a practically significant effect can be attained in that the addition of $CeO_2$ prevents harmful ultraviolet rays from leaking out of the lighting device.

The content of $CeO_2$ is preferably about 0.02 to about 0.125 wt %, more preferably about 0.05 to about 0.1 wt %, based on the total amount of transparent white fluorescent glass of the present invention.

Too low a $CeO_2$ content fails to obtain a satisfactory luminescence enhancement effect. In contrast, too high a $CeO_2$ content causes problems: Sn ions are oxidized to increase the amount of $Sn^{4+}$, which does not absorb UV light, resulting in a reduced white fluorescent intensity, and a light intensity of $Ce^{3+}$ itself is increased, resulting in an enhanced blue light from $Ce^{3+}$. Thus, too high a $CeO_2$ content is not preferable.

In the transparent white fluorescent glass of the present invention, the glass preferably contains about 0.8 to about 2.5 wt % of Sn, calculated as SnO, about 0.045% or less of Fe, calculated as $Fe_2O_3$, about 0.02 to about 0.14 wt % of Ce, calculated as $CeO_2$; more preferably contains about 1 to about 2 wt % of Sn, calculated as SnO, about 0.02 to about 0.04 wt % of Fe, calculated as $Fe_2O_3$, and about 0.05 wt % to 0.1 wt % of Ce, calculated as $CeO_2$; based on the total amount of transparent white fluorescent glass.

Various kinds of glass-forming materials capable of forming a soda lime glass with the intended composition after melting are mixed at the predetermined proportion, and a predetermined amount of additive component is further added to the mixture. Then, the resulting mixture is melted, and then cooled and solidified to give a transparent white fluorescent glass of the invention.

The soda lime glass used as a base component can be formed from a known glass-forming material such as $Na_2CO_3$, $CaCO_3$ and $SiO_2$.

As a source of tin oxide that acts as an additive component, the following compounds can be used: a compound that is capable of being present as an intended oxide or a compound that is capable of forming an intended oxide in the glass produced by melting. Examples thereof include SnO and the like. Although $SnO_2$ requires valence adjustment by oxidation-reduction reaction when forming the glass, it can be used singly or in combination with SnO. A photo-sensitizer such as $CeO_2$ can be simply mixed with a predetermined amount of the raw material.

In general, the Fe content can be controlled by adjusting the content of Fe included in the raw material components of the soda lime glass.

The fluorescent glass of the present invention is transparent in the visible spectrum range, and exhibits a white light caused by irradiation with ultraviolet ray of 300 nm or less. The wavelength of the ultraviolet ray to be irradiated is preferably in the range of 240 to 260 nm. The fluorescent glass of the invention can reduce harmful UV rays such as a UV ray (254 nm) emitted from Hg that is widely used in lamps, etc.

In view of its excellent optical properties, the fluorescent glass of the invention is applicable as a glass material for lighting apparatus, and for various kinds of displays, such as liquid crystal displays, PDPs, organic EL displays, and LED displays.

The transparent fluorescent glass of the invention can be suitably applied to an illuminating system that functions as a daylight window and a lighting apparatus. FIG. 1 shows its structure.

In the illuminating system explained in the Figure, a UV transmitting medium (silica membrane, porous glass, decompression gas, etc.) is included between two fluorescent glass plates of the present invention, and a black light (ultraviolet wavelength of 254 nm) is disposed at each end of the glass plates. The illuminating system shown in the Figure can be mounted to an outer wall or a ceiling part of a building.

Under time or weather conditions where illumination is needed, when a black light turns on, ultraviolet rays that pass through the medium are introduced evenly into the glass to allow the glass to emit a white light and function as an indoors lighting system.

In the daytime, however, the glass can be used as a normal daylight window by turning off the black light of the device. An infrared reflecting film is formed on the surface of the fluorescent glass plate provided outside of the building to prevent the rise of the indoor temperature by radiant heat from outside during the day time. As infrared reflecting films, known oxide films (chromium oxide film, cobalt oxide film, etc.), metallic films (Co, Ni), etc. can be used.

Particularly, when a material such as a porous glass having UV transmittance and heat insulating property is used as a UV transmitting medium, the adiabatic effect between indoors and outdoors can be improved.

Thus, a natural lighting and illuminating system as shown in the Figure has the function of a normal window, guiding natural light into a building in the daytime, and a lighting system at night, and thus it enables people to live a natural and comfortable life.

EFFECT OF THE INVENTION

The present invention includes as a base glass a soda lime glass that is inexpensive and easily made, and thus, a large fluorescent glass plate having a size of tens of centimeters or more can be obtained at low cost.

The fluorescent glass of the invention exhibits a white light with high efficiency and high intensity by ultraviolet excitation. Since the fluorescent glass converts irradiated UV rays to fluorescence with high efficiency, it transmits almost no ultraviolet rays to the outside.

BEST MODE FOR CARRYING OUT THE INVENTION

The following Examples illustrate the present invention in further detail.

EXAMPLES 1 TO 4 AND COMPARATIVE EXAMPLES 1 TO 5

$Na_2CO_3$, $CaCO_3$, $SiO_2$, and $Al(OH)_3$ were used as glass-forming materials, and mixed in such an amount that the proportion of $Na_2O$ was 15.3 wt %, CaO was 10.2 wt %, $SiO_2$ was 73.2 wt %, and $Al_2O_3$ was 1.3 wt % after melting. Then, as a source of Sn, SnO was further added to the mixture, and the resulting mixture was melted at 1400° C. for 4 hours.

The melted product was gradually cooled. Subsequently, a piece of glass was cut from the product and polished, thus giving a sample having a size of 1 mm×10 mm×10 mm. The amount of Fe (calculated as $Fe_2O_3$ (wt %)) and Sn (calculated as SnO (wt %)) in the glass samples obtained are shown in Table 1 below.

The glass samples obtained were left in a dark room and disposed over a 4 W black light (low-pressure mercury lamp, center wavelength: 254 nm, ultraviolet-ray intensity on the incidence plane of the sample: 1.4 mW/cm$^2$), and irradiated with UV light. The luminance of the sample was measured using a luminance meter (MINOLTA LS-110). Further, the UV transmittance of the sample at 254 nm was also measured.

Figure 1:
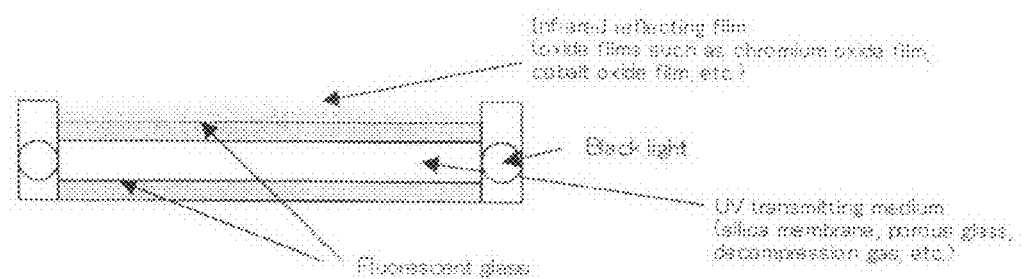
FIG. 1 is a sectional view showing an embodiment of a natural lighting and illuminating system comprising the transparent fluorescent glass of the present invention.
Figure 2:
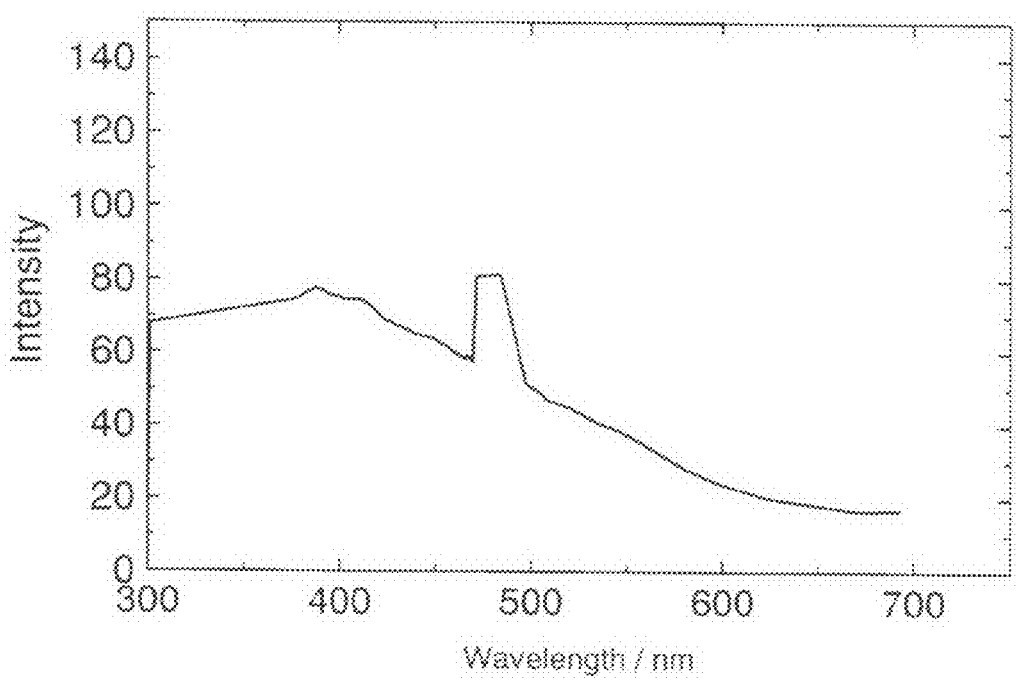
FIG. 2 is a chart showing a fluorescent spectrum of the glass of Example 4.

The results are shown in Table 1 with the results of Comparative Examples 1 to 5. FIG. 2 shows the fluorescence spectrum of the glass obtained in Example 4.

TABLE 1

| Example/<br>Comp. Ex. | $Fe_2O_3$ | SnO | Transmittance<br>at 254 nm (%) | Luminance<br>(cd/m$^2$) |
|---|---|---|---|---|
| Example 1 | 0.04 | 1 | 0 | 51.27 |
| Example 2 | 0.02 | 1 | 0 | 70.49 |
| Example 3 | 0.04 | 2 | 0 | 70.50 |
| Example 4 | 0.02 | 2 | 0 | 90.70 |
| Comp. Ex. 1 | 0.07 | 0.5 | 0 | 5.80 |
| Comp. Ex. 2 | 0.04 | 0.5 | 0 | 17.34 |
| Comp. Ex. 3 | 0.02 | 0.5 | 0 | 18.00 |
| Comp. Ex. 4 | 0.07 | 1.0 | 0 | 38.12 |
| Comp. Ex. 5 | 0.07 | 2.0 | 0 | 42.00 |

The results of Table 1 and FIG. 2 reveal that, according to the present invention, a fluorescent glass exhibiting a high luminance of 50 cd/m$^2$ or more in the white light region can be obtained by controlling the additive component content and $Fe_2O_3$ content.

EXAMPLES 5 TO 8 AND COMPARATIVE EXAMPLES 6 TO 7

$Na_2CO_3$, $CaCO_3$, $SiO_2$, and $Al(OH)_3$ were used as glass-forming materials, and mixed in such an amount that the proportion of $Na_2O$ was 15.3 wt %, CaO was 10.2 wt %, $SiO_2$ was 73.2 wt %, and $Al_2O_3$ was 1.3 wt % after melting. Then, SnO as a source of Sn and $CeO_2$ as a source of Ce were further added to the mixture, mixed, and melted at 1400° C. for 4 hours.

Then, the melted product was gradually cooled. Subsequently, a piece of the glass was cut from the product and polished, thus giving a sample having a size of 1 mm×10 mm×10 mm. The amount of Fe (calculated as $Fe_2O_3$ (wt %)), Sn (calculated as SnO (wt %)) and Ce (calculated as $CeO_2$ (wt %)) in the glass samples obtained are shown in Table 2 below.

The glass samples obtained were left in a dark room and disposed over a 4 W black light (low-pressure mercury lamp, center wavelength: 254 nm, ultraviolet-ray intensity on the incidence plane of the sample: 1.4 mW/cm$^2$), and irradiated with UV light. The luminance of the sample was measured using a luminance meter (MINOLTA LS-110). Further, the UV transmittance of the sample at 254 nm was measured. The UV transmittance of the sample at 315 nm was also measured.

Figure 3:
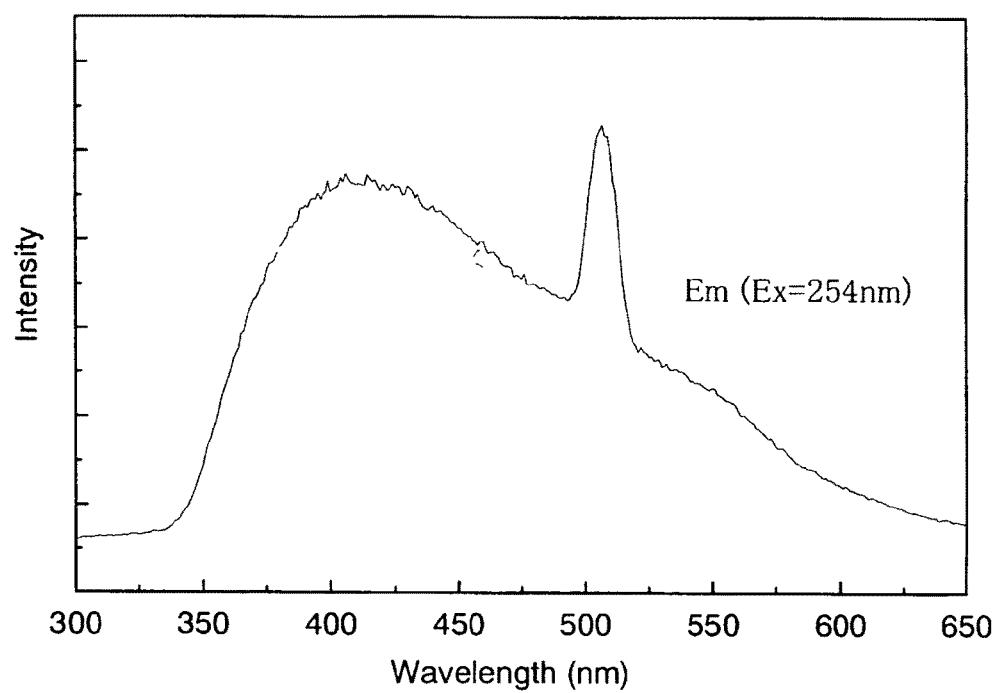
FIG. 3 is a chart showing the fluorescent spectrum of the glass of Example 7.

The results are shown in Table 2 with the results of Comparative Examples 6 to 7. FIG. 3 shows the fluorescence spectrum of the glass obtained in Example 7.

TABLE 2

| Example/Comp. Ex. | $Fe_2O_3$ | SnO | $CeO_2$ | Transmittance at 254 nm (%) | Transmittance at 315 nm (%) | Luminance (cd/m$^2$) |
|---|---|---|---|---|---|---|
| Example 5 | 0.05 | 1.5 | 0.05 | 0 | 18.2 | 59.82 |
| Example 6 | 0.05 | 1.5 | 0.07 | 0 | 13.6 | 55.18 |
| Example 7 | 0.05 | 1.5 | 0.10 | 0 | 6.3 | 56.23 |
| Example 8 | 0.05 | 1.5 | 0.12 | 0 | 4.0 | 60.71 |
| Comp. Ex. 6 | 0.05 | 1.5 | 0.15 | 0 | 2.7 | 49.90 |
| Comp. Ex. 7 | 0.05 | 1.5 | 0 | 0 | 87.0 | 48.00 |

The results of Table 2 and FIG. 3 reveal that, according to the present invention, a fluorescent glass exhibiting an extremely high luminance of 55 cd/m$^2$ or more in the white light region can be obtained by controlling the SnO and CeO$_2$ contents, as additive components, and the Fe$_2$O$_3$ content.

The invention claimed is:

1. A transparent fluorescent glass exhibiting white light by ultraviolet excitation, the glass comprising a soda lime glass as a base material, Sn and Fe, wherein said transparent fluorescent glass contains 0.8 to 2.5 wt % of Sn, calculated as SnO, and up to 0.045 wt % of Fe, calculated as Fe$_2$O$_3$.

2. A transparent fluorescent glass exhibiting white light by ultraviolet excitation according to claim 1, wherein the content of Fe is 0.02 to 0.04 wt %, calculated as Fe$_2$O$_3$.

3. A lighting system comprising the transparent white fluorescent glass according to claim 1.

4. A display device comprising the transparent fluorescent glass according to claim 1.

5. A transparent fluorescent glass exhibiting white light by ultraviolet excitation according to claim 1, wherein said transparent fluorescent glass includes 0.02 to 0.14 wt % of Ce, calculated as CeO$_2$.

6. A transparent fluorescent glass exhibiting white light by ultraviolet excitation according to claim 1, wherein the content of Sn is 1 to 2 wt %, calculated as SnO.

7. A transparent fluorescent glass exhibiting white light by ultraviolet excitation according to claim 1, wherein said glass contains 0.02 to 0.045 wt. % Fe.

8. A transparent fluorescent glass exhibiting white light by ultraviolet excitation, the glass comprising soda lime glass as a base material, 0.8 to 2.5 wt % of Sn, calculated as SnO, 0.02 to 0.14 wt % of Ce, calculated as CeO$_2$, and 0.02 to 0.04 wt % of Fe, calculated as Fe$_7$O$_3$.

9. A lighting system comprising the transparent fluorescent glass according to claim 8.

10. A display device comprising the transparent fluorescent glass according to claim 8.

11. A transparent fluorescent glass exhibiting white light by ultraviolet excitation according to claim 8, wherein the content of Sn is 1 to 2 wt %, calculated as SnO.

12. A transparent fluorescent glass exhibiting white light by ultraviolet excitation according to claim 11, wherein said transparent fluorescent glass includes 0.05 to 0.1 wt % of Ce, calculated as CeO$_2$.

13. A transparent fluorescent glass exhibiting white light by ultraviolet excitation according to claim 8, wherein said transparent fluorescent glass includes 0.05 to 0.1 wt % of Ce, calculated as CeO$_2$.

14. A transparent fluorescent glass exhibiting white light by ultraviolet excitation according to claim 1, wherein said transparent fluorescent glass includes 0.05 to 0.1 wt % of Ce, calculated as CeO$_2$.

* * * * *